US008548792B2

(12) United States Patent
Pyle

(10) Patent No.: US 8,548,792 B2
(45) Date of Patent: Oct. 1, 2013

(54) ELECTRONIC LANGUAGE SIMULATOR SYSTEM AND METHOD

(75) Inventor: James O. Pyle, Springfield, VA (US)

(73) Assignee: Dyncorp International LLC, Falls Church, VA (US)

( * ) Notice: Subject to any disclaimer, the term of this patent is extended or adjusted under 35 U.S.C. 154(b) by 469 days.

(21) Appl. No.: 12/789,168

(22) Filed: May 27, 2010

(65) Prior Publication Data

US 2010/0305939 A1 Dec. 2, 2010

Related U.S. Application Data

(60) Provisional application No. 61/181,918, filed on May 28, 2009.

(51) Int. Cl.
*G06F 17/28* (2006.01)

(52) U.S. Cl.
USPC ............................ 704/2; 704/4; 704/7; 704/9

(58) Field of Classification Search
USPC .......................................................... 704/2–9
See application file for complete search history.

(56) References Cited

U.S. PATENT DOCUMENTS

2003/0009352 A1* 1/2003 Bolotinikov et al. ............. 705/1
2006/0064342 A1* 3/2006 Frengut et al. .................. 705/10
2010/0003652 A1* 1/2010 Lavie et al. ................... 434/219
2011/0116432 A1* 5/2011 Doppler et al. ............... 370/312

* cited by examiner

*Primary Examiner* — Leonard Saint Cyr
(74) *Attorney, Agent, or Firm* — Morrison & Foerster LLP

(57) ABSTRACT

Described are field of training devices and methods to simulate the use of interpreters and spontaneous verbal exchanges between participants who speak different languages. More particularly, the devices and methods simulate an environment wherein participants are communicating through a third-party interpreter, which simulates the use of an interpreter. Some embodiments of the devices include audio components that are configured in a manner that distorts direct verbal communication between two parties of a trilateral verbal exchange. Although the direct verbal communication is distorted, tonality and tempo of the communication can still be preserved. Further, visual information from the speaker is still conveyed.

26 Claims, 8 Drawing Sheets

ELECTRONIC LANGUAGE SIMULATOR SYSTEM AND METHOD

CROSS-REFERENCE TO RELATED APPLICATION

This application claims the benefit of U.S. Provisional Application Ser. No. 61/181,918, filed May 28, 2009, the entirety of which is incorporated herein by reference.

FIELD OF THE INVENTION

This relates to a field training device and methods to simulate the use of interpreters and spontaneous verbal exchanges between participants who speak different languages. More particularly, the present invention relates to devices and methods for simulating an environment wherein participants are communicating through a third-party interpreter.

BACKGROUND OF THE INVENTION

Communication between parties speaking different languages has both verbal and non-verbal components. To facilitate verbal communications, it is often necessary to use a third-party interpreter who attempts to translate the language of the speaker to that of the listener in a manner which preserves the literal content and nuances of the speaker's statements. During such exchange, both the speaker and the listener are provided non-verbal information such as body language, gestures, and the tonality/tempo of the speaker's voice. In training individuals to participate in communication through the use of interpreters, it is important to provide an environment in which the language of the speaker is unintelligible to the listener but which replicates the spontaneity of the verbal exchanges and preserves the non-verbal components.

Prior training techniques utilized a debriefer/trainee, a foreign language source speaker and a third-party interpreter speaker that speaks both the foreign language of the source speaker and the primary language of the debriefer/trainee. Accordingly, these techniques required the use of two participants that speak a common foreign language. In addition, an audience listening in on the training session may not understand the exchange when the foreign language speakers are talking during the exchange unless they also speak the foreign language.

SUMMARY OF THE INVENTION

Described are field training devices and methods to simulate the use of interpreters and spontaneous verbal exchanges between participants who speak different languages. More particularly, the devices and methods simulate an environment wherein participants are communicating through a third-party interpreter.

Some embodiments of the devices include audio components that are configured in a manner that distorts direct verbal communication between two parties of a trilateral verbal exchange, which simulates the use of an interpreter. Although the direct verbal communication is distorted, tonality and tempo of the communication can still be preserved. Further, visual information from the speaker is still conveyed.

One embodiment of a method of simulating a conversation utilizing an interpreter includes: a) distorting speech between a debriefer and a source utilizing a sound processing system, while simultaneously providing undistorted speech from the debriefer or the source to a translator, b) distorting speech between the translator and the debriefer utilizing the sound processing system, while simultaneously providing undistorted speech from the translator to the source when the translator is speaking to the source, and c) distorting speech between the translator and the source utilizing the sound processing system, while simultaneously providing undistorted speech from the translator to the debriefer when the translator is speaking to the debriefer.

The sound processing system may utilize a duel reverse algorithm that combines a speech signal with its reversed counterpart that is delayed to distort speech. The delay may be, for example, between 125 milliseconds and 150 milliseconds. The sound processing system may include a debriefer microphone, a translator microphone, and a source microphone. The sound processing system may also include debriefer headphones, translator headphones, and source headphones. The processing system may further include a mixer, a pre-amplifier, and an interpreter switch box to allow the interpreter to switch between speaking to the debriefer and speaking to the source.

One embodiment of an interpreter simulator includes a sound processing system configured to: a) distort speech between a debriefer and a source, while simultaneously allowing undistorted speech from the debriefer or the source to a translator, b) distort speech between the translator and the debriefer, while simultaneously allowing undistorted speech from the translator to the source when the translator is speaking to the source, and c) distort speech between the translator and the source, while simultaneously providing undistorted speech from the translator to the debriefer when the translator is speaking to the debriefer.

Another embodiment of an interpreter simulator includes a debriefer input configured to accept speech from a debriefer, a translator input configured to accept speech from a translator, a source input configured to accept speech from a source, a debriefer output configured to output sound to the debriefer, a source output configured to output sound to the source, and a sound processor. The sound processor is configured to: a) output distorted sound corresponding to the accepted speech from the debriefer to the source, b) output distorted sound corresponding to the accepted speech from the source to the debriefer, c) output distorted sound corresponding to the accepted speech from the translator to the source and simultaneously output undistorted sound corresponding to the accepted speech from the translator to the debriefer when the translator is talking to the debriefer, and d) output distorted sound corresponding to the accepted speech from the translator to the debriefer and simultaneously output undistorted sound corresponding to the accepted speech from the translator to the source when the translator is talking to the source.

The interpreter simulator may further include a translator output configured to output sound to the translator. The outputted sound to the translator may include undistorted speech from the debriefer or the source.

Another embodiment a method of simulating a conversation utilizing an interpreter includes: a) accepting speech from a debriefer, b) distorting the speech from the debriefer utilizing a sound processor to produce a distorted debriefer speech, c) providing the distorted debriefer speech to the source, and simultaneously providing an undistorted speech from the debriefer to a translator, d) accepting speech from the translator, e) distorting the speech from the translator utilizing a sound processor to produce a distorted translator speech, f) providing the distorted translator speech to the debriefer, and simultaneously providing an undistorted speech from the translator to the source, when the translator speaks to the source, g) accepting speech from the source, h)

distorting the speech from the source utilizing a sound processor to produce a distorted source speech, and i) providing the distorted source speech to the debriefer, and simultaneously providing an undistorted speech from the source to the translator.

The method may further include accepting speech from the translator, distorting the speech from the translator utilizing a sound processor to produce a distorted translator speech, and providing the distorted translator speech to the source, and simultaneously providing an undistorted speech from the translator to the debriefer, when the translator speaks to the debriefer.

DETAILED DESCRIPTION OF THE DRAWINGS

DETAILED DESCRIPTION OF THE INVENTION

Figure 1:
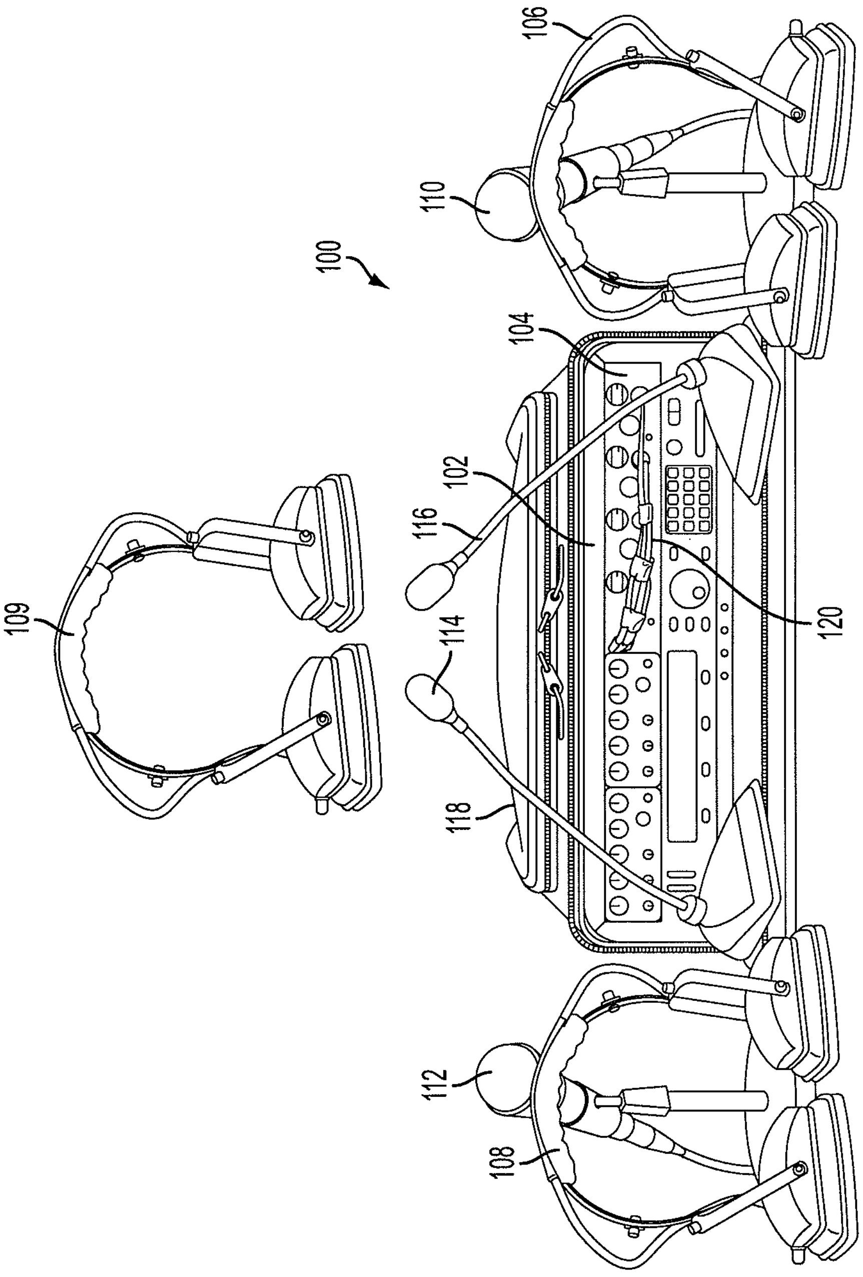
FIG. 1 is a perspective view of an electronic language simulator system according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an electronic language simulator system 100 (hereinafter "the simulator") that can be used as a training tool that replicates the interpersonal dynamics and challenges of using an interpreter to communicate with foreign language speakers. The simulator 100 can be used as a training application to practice using an interpreter to bridge a language barrier to allow two parties to effectively communicate.

Training exercises with the simulator 100 can be conducted among parties having a common language, thereby eliminating the necessity of foreign speakers or qualified interpreters. All parties can speak into a microphone and the simulator 100 can process the common language to simulate a foreign language. The principle parties of the simulator 100 can be a debriefer, a source, and the interpreter. To simulate real-life simulations, the debriefer can be or act as an interrogator, interviewer, screener, investigator, or official, and the source can be or act as a prisoner of war, detainee, suspect, applicant or other subject of interest. In some embodiments, the simulator 100 can require a common language understanding between the interpreter and the parties involved (i.e., the debriefer and the source), but not require a common language understanding between the parties involved.

As shown in FIG. 1, the simulator 100 can include a main box 102 with a front panel 104, source headphones 106, debriefer headphones 108, a source microphone 110, a debriefer microphone 112, interpreter microphones 114 and 116, and various connector cables 120. The source headphones 106 and debriefer headphones 108 are preferably sound isolating headphones that prevent the source and the debriefer from hearing one another directly. Although sound isolating headphones are pictured in FIG. 1, sound isolating earbuds may also be used. In addition, in some embodiments, the headphones may include wireless and/or noise cancelation technologies. The simulator may also include interpreter headphones 109. The interpreter headphones 109 may not be necessary in some embodiments since the interpreter may hear what the source and the debriefer say directly without headphones. However, in order to insure that the interpreter is isolated from the surroundings and is placed into the same audio environment as the source and the debriefer, the simulator may also include interpreter headphones 109 for conveying the undistorted voices of the source and the debriefer to the interpreter.

The microphones may any type of conventional microphones. Preferred microphones include throat microphones. Throat microphones are able to work in a variety of sound environments that may cause other microphones to falter. For example, throat microphones can distinguish speech in load environments and are also able to pick up whispers.

During use, a debriefer speaks into debriefer microphone 112. The undistorted voice of the debriefer is conveyed to the interpreter through interpreter headphones 109 and the distorted voice of the debriefer is conveyed to the source through source headphones 106. The interpreter then speaks into source interpreter microphone 116 echoing what the interpreter just heard from the debriefer. The undistorted voice of the interpreter is conveyed to the source through source headphones 106 and the distorted voice of the interpreter is conveyed to the debriefer through debriefer headphones 108. The source then responds by speaking into source microphone 110. The undistorted voice of the source is conveyed to the interpreter through interpreter headphones 109 and the distorted voice of the source is conveyed to the debriefer through debriefer headphones 108. The interpreter then speaks into debriefer interpreter microphone 114 echoing what the interpreter just heard from the debriefer. The undistorted voice of the interpreter is conveyed to the debriefer through debriefer headphones 108 and the distorted voice of the interpreter is conveyed to the source through source headphones 106. The debriefer, the interpreter and the source are able to hear their own undistorted voice through their respective headphones when they speak.

The main box 102 can be enclosed in a protective material, such as thick, cloth material 118 (as shown in FIG. 1) or a hard casing (not shown). The main box 102 can be arranged in the protective material such that the front panel can be exposed. For example, FIG. 1 shows the protective material 118 having a zippered opening to expose the front panel. Also, an additional casing surrounded by the protective material can be included to house the microphones, headphones, and connector cables when the simulator is not in use or being transported. The protective material and the additional casing can allow the simulator 100 to be easily portable.

Figure 2:
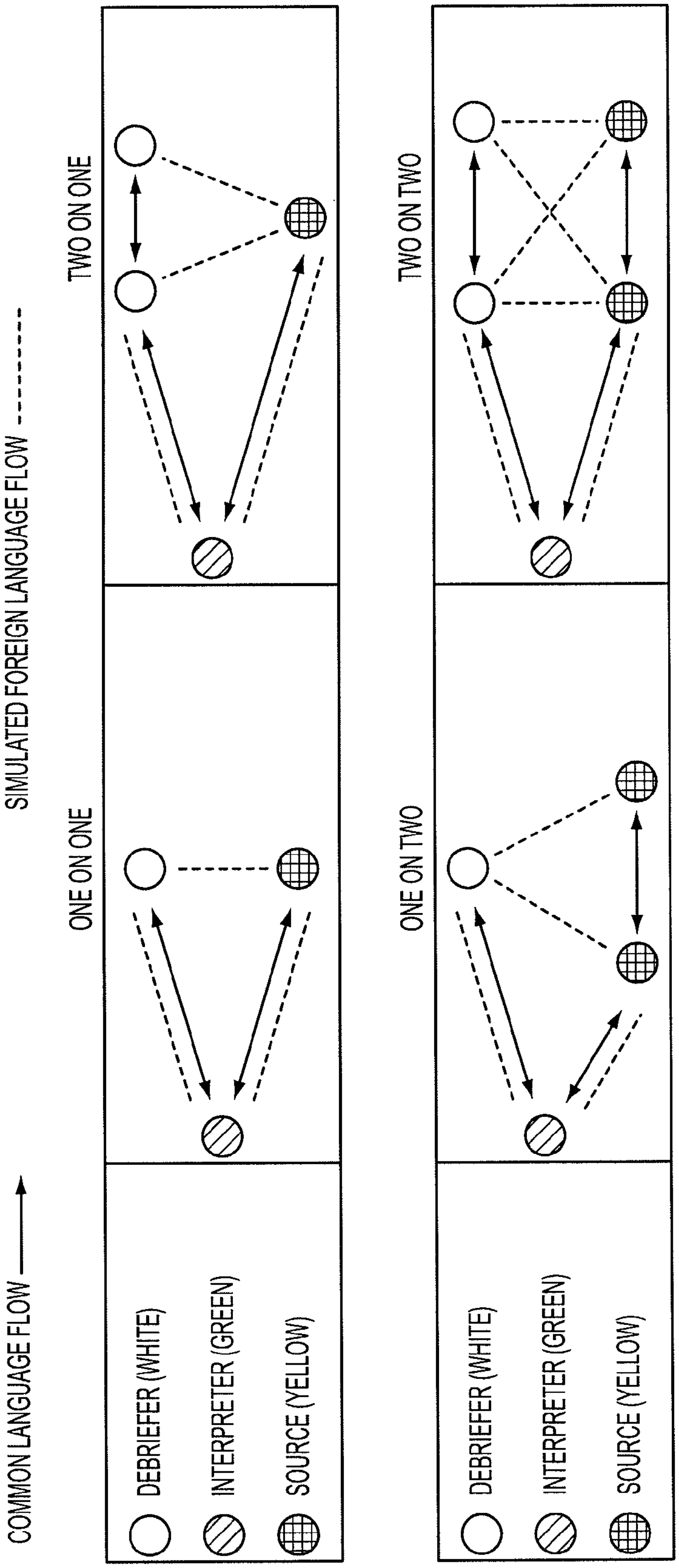
FIG. 2 is an outline showing communications between parties using the simulator of FIG. 1 according to an embodiment of the invention.

There can be multiple debriefers and/or sources in some exercises, and thus, the simulator 100 can be configured to train one on one, two on one, one on two, or two on two as shown in FIG. 2. FIG. 2 is an outline showing common language communication flows between parties using the simulator of FIG. 1 according to an embodiment of the invention. In FIG. 2, solid lines with arrows can depict the flow of common language as spoken between the debriefer and the interpreter, and the source and the interpreter. The broken line can represent the simulated foreign language flow occurring simultaneously. For example, when common language is spoken between the debriefer and the interpreter, the source will hear the simulated foreign language from both. Similarly, when common language is spoken between the source and the interpreter, the debriefer will hear the simulated foreign language from both. Further, communication between the debriefer and the source can always be in the simulated foreign language.

Figure 3:
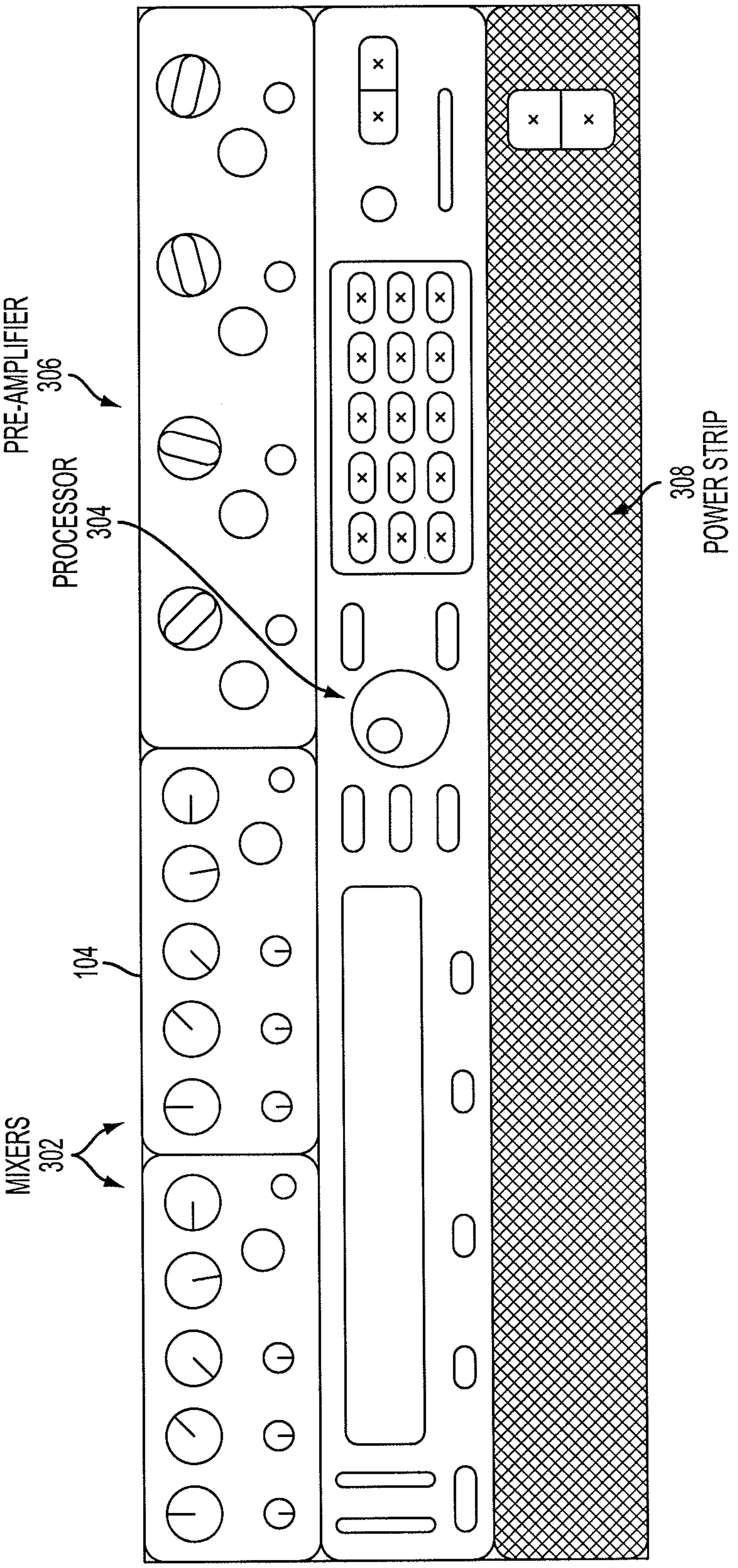
FIG. 3 is a front panel of a main box of the simulator of FIG. 1 according to an embodiment of the invention.

The front panel of the 104 of the simulator 100 can act as a user interface. As shown in FIG. 3, the front panel 104 can include controls for a processor 304, mixers 302, pre-amplifiers 306, and a power conditioner 308. The processor 304 can use one party's input (e.g., the source's) to create an artificial language which simulates an unknown language and output the artificial language to the other party (e.g., the debriefer). The processor 304 can include various buttons, such as a "mix program" button and a "delay program" button, various knobs, such as a tuning knob, and a program keypad. In some embodiments, the settings for the processor are to mix (e.g., using the "mix program" button) and/or to delay (e.g., using the "delay program" button). In some embodiments, the processor 304 is a preset internal component of simulator 100 and is not viewable or adjustable via the front panel 104. The interpreter can be the main operator of the simulator 100 and can use the front panel to set and/or adjust the settings. The interpreter can adjust the settings with either the tune knob or the key pad. The processor 304 can also include a "program" button for when the processor 304 needs to be reprogrammed. In addition, the processor 304 can include a recording device (not shown) to record exchanges between parties. The recording device can be beneficial for teaching exercises, for example, allowing users to review conversations and listen to opposite sides of conversations. Also, the recording device can be integrated within the simulator 100, or an extra accessory that can be connected to the simulator 10 (e.g., an extra plug-in device).

In some embodiments, for example where the simulator 100, is configured to be portable, all connections (e.g., from the microphones, headphones, etc.) may be inaccessible from the front panel. For example, the additional casing that stores the microphones and/or headphones can be integral with the simulator casing. Labeled cables already connected to a back portion of the main box can then be routed through the additional casing and stay connected to the microphones or headphones. Thus, the simulator 100 may require minimal setup because fewer connections need to be made. Further, the processor may be preprogrammed or configured with a single program, which may allow for the number of controls of the simulator to be reduced. Setup could then essentially consist of pulling out the microphones and headphones, turning on the simulator 100, and adjusting volume settings.

The mixers 302 can include a source mixer and a debriefer mixer. The source's headphones and the debriefer's headphones can be plugged into headphone jacks in the respective mixers. The mixers 302 can then be used to mix inputs from the processor 304 and output them to the headphones, as well as balance and adjust sound levels of the mixed inputs. In some embodiments, the headphones used can also include additional volume controls. Further, the headphones can be passive sound-canceling headphones and can be well-insulated. When there is more than one debriefer, a splitter can be used to connect both debriefer headphones into a single headphone jack. Additionally, in some embodiments, the mixers 302 can further include an interpreter mixer. Inputs to the interpreter mixer can include audio output from both the source and the debriefer. This can permit the isolation of the source's voice and the debriefer's voice, allowing the interpreter to adjust volume levels from the source and the debriefer individually and eliminate ambient noise.

The output of the microphones can be routed to the pre-amplifier 306 to condition the output signals. The pre-amplifier 306 can include, for example, four adjustment knobs and four input jacks, as shown in FIG. 3. A source microphone and a debriefer microphone can be connected to two of the four input jacks. When there is more than one debriefer, a splitter or y-connector can be used to connect both debriefer inputs to one input jack.

Figure 4:
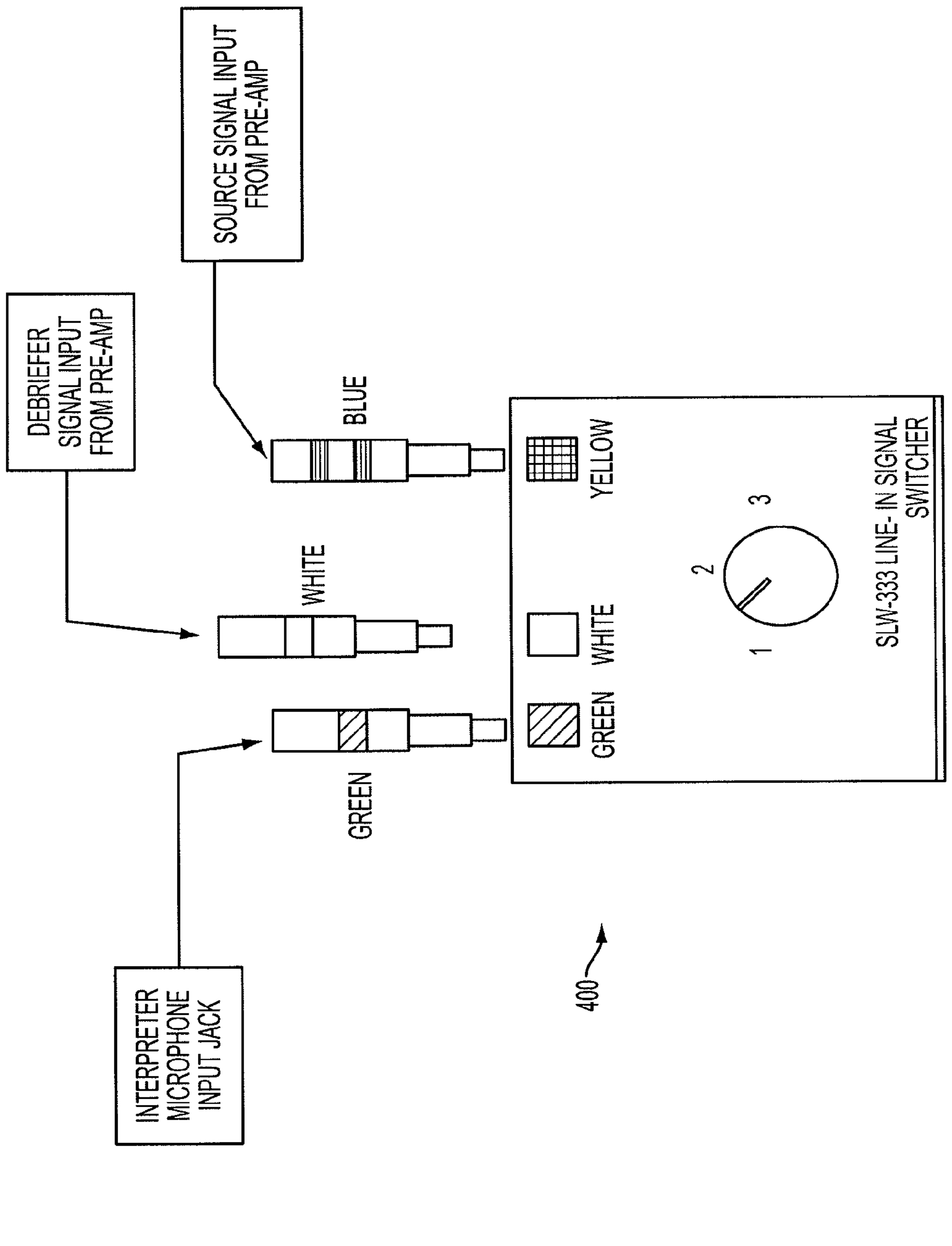
FIG. 4 is an interpreter switch of the simulator of FIG. 1 according to an embodiment of the invention.

As shown in FIG. 4, the simulator 100 can also include an interpreter switch box 400, or switch boxes, or individual microphones for use by the interpreter. A single interpreter's microphone can be connected to an interpreter switch box or switch boxes. An example of a switch box that may be used is the HOSA TECHNOLOGY SLW-333. The interpreter switch box, or switch boxes, can further include a push to talk switch to allow the interpreter to alternate output between the source and the debriefer (via a source output and a debriefer output), as further explained below. The debriefer output (meant to be throughput to the debriefer) and the source output (meant to be throughput to the source) can be plugged into the other two input jacks of the pre-amplifier, respectively. The four adjustment knobs can be used to adjust the volume for each respective input. In some embodiments, the pre-amplifier can be a single component with four adjustment knobs and four input jacks, as shown in FIG. 3, or two separate components, each with two adjustment knobs and two input jacks. In addition, the power conditioner can act as a primary power source for the simulator 10. The power conditioner can also include a power on/off switch or button.

The interpreter switch can smoothly direct the flow of communication from the interpreter to the debriefer(s) and the source. Specifically, the interpreter switch can direct the interpreter's unprocessed, or undistorted, output to one party (e.g., the debriefers) and the interpreter's processed output to the other party (e.g., the source) or vice versa. The interpreter can operate the switch between positions 1, 2 and 3, as shown in FIG. 4. In FIG. 4, the debriefer is at position 1, the interpreter is at position 2, and the source is at position 3. Position 1 can direct the interpreter's undistorted output to the debriefer, position 2 can be considered an interpreter rest position, and position 3 can direct the interpreter's undistorted output to the source. When the interpreter wishes to speak with the debriefer, the switch can be in position 1. In this position the debriefer, or debriefers, and interpreter can speak to and hear each other in their common language. The source can also hear the debriefers and the interpreter in a simulated foreign language. In position 2, no interpreter output is directed to the debriefer or the source, but both the debriefer and the source can still communicate with each other in the simulated foreign language. When the interpreter wishes to speak with the source, the switch can be in position 3. In position 3, the debriefer can hear the source and the interpreter in the simulated foreign language and the source and the interpreter can speak to and hear each other in their common language. In position 1, 2, or 3, the interpreter can hear and understand both the debriefer and the source in the respective common language directly, and in some embodiments, without the use of headphones. Further, regardless of the interpreter switch position, the source and the debriefer hear each other in the simulated foreign language.

To complete a communication cycle the interpreter can repeat the debriefer's words in the common language to the source (when in position 3) or can repeat the source's words in the common language to the debriefer (when in position 1). With the switch in the position 1 (i.e., the debriefer position), all conversations between the debriefer and the interpreter are distorted to the source. Conversely, with the switch in the position 3 (i.e., the source position), all conversations between the source and the interpreter are distorted to the debriefer. In all instances, direct conversation between the debriefer and the source is distorted.

The following description depicts an example use of the simulator 100 between the source, the debriefer, and the interpreter. Additional sources, debriefers, and/or interpreters can be included through the use of redundant components and routing (e.g., additional microphones, headphones, and cable splitters and y-connectors). Each party (i.e., each source, debriefer, and interpreter) can be equipped with their respective headphones and respective microphones. In some embodiments, the interpreter can require no headphones since the interpreter shares a common language between both the debriefer and the source. The voices of the debriefer and the source can be provided to each other after undergoing sufficient distortion to obscure the verbal content, while simultaneously being provided without distortion to the interpreter. The interpreter can then relay the statements of the speaking party (the debriefer or the source) to the other party without distortion and in the respective common language.

Figure 5:
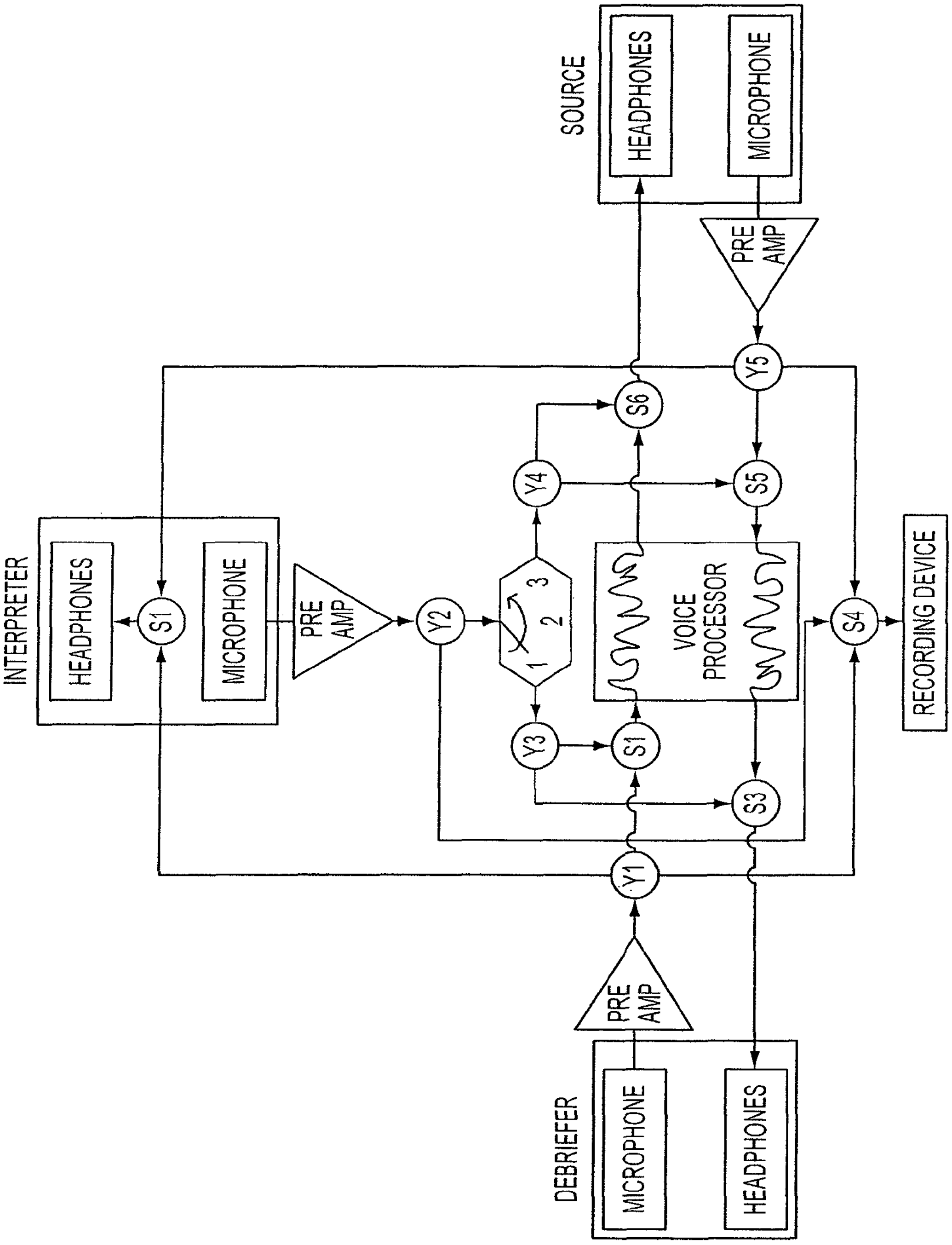
FIG. 5 is a schematic of an electronic language simulator system according to an embodiment of the invention.

The following description of FIG. 5 depicts an example use of the simulator 100 according to another embodiment of the invention. The debriefer's voice, after being conditioned by the pre-amplifier, is routed to a splitter Y1. One output of the splitter Y1 is routed to a summer S1 which provides an input to the interpreter's headphones. A second output of the splitter Y1 is routed to a summer S4 as an input to a recording device that monitors the common language transactions between the parties. The remaining output of the splitter Y1 is routed to a summer S1.

The output of the interpreter's microphone pre-amplifier is routed to a two-way splitter Y2. One output of the splitter Y2 is routed to the summer S4 and is an additional input to the recording device. The other output of the splitter Y2 is routed to a switch which permits the interpreter to communicate without distortion to either the debriefer or the source while distorting such communication with the other. The interpreter first toggles the switch to position 1 to speak with the debriefer. The output from the switch to the debriefer is routed to a splitter Y3. One output from the splitter Y3 is routed to the summer S1 and is combined with the output of the debriefer's microphone, thus including any communications between the interpreter and the debriefer. Another output from the splitter is routed to a summer S3, which is further routed to the debriefer's headphones.

The mixed signal coming from the summer S1, composed of the output from the debriefer and output from the interpreter directed to the debriefer, is routed to a first channel of a voice processor (such as the processor of FIGS. 1-3) which renders the output incomprehensible. The distorted output from the first channel is then routed to a summer S6. The output of the summer S6 is routed to the source's headphones. Therefore, the debriefer's and the interpreter's voices have been processed by the voice processor and routed to the source.

The interpreter "translates" to the source by toggling the interpreter switch to position 2 to provide an undistorted output to the source's headphones from the splitter Y4 to the summer S6. The debriefer's voice, however, is still distorted when output to the source's headphone, as it still comes from the first channel of the voice processor through the summer S6. The interpreter's communication with the source is also routed to a summer S5 and mixed with an output from the source's microphone (via the source's microphone's pre-amplifier and a splitter Y5). The output of the summer S5 is transmitted to a second channel of the voice processor. The output from the second channel of the voice processor, a distorted output from the interpreter and the source, is transmitted to the debriefer's headphones via the summer S3.

The output from the source's microphone, through the pre-amplifier is routed to the splitter Y5. As mentioned above, one output from the splitter Y5 is transmitted to the summer S5. Another output from the splitter Y5 is routed to the summer S1, and further routed to the interpreter's headphones. A third output from the splitter Y5 is directed to the summer S4 and then routed to the recording device.

Therefore, when the switch is in position 1, the debriefer's headphones receive undistorted output from the interpreter and distorted output from the source, while the source's headphones receive distorted output from both the interpreter and the debriefer. When the switch is in position 2, the source's headphones receive undistorted output from the interpreter and distorted output from the debriefer, while the debriefer's headphones receive distorted output from both the interpreter and the source. In some embodiments, there can be a pre-amplifier following each output from the switch rather than a single pre-amplifier before the switch, such as, for example, with the simulator 100 shown in FIGS. 1-3. In other embodiments, as illustrated in FIGS. 6 and 7, which are schematics of another embodiment of an electronic simulator, the electronic simulator 100 can include four pre-amplifiers and two separate microphones for the interpreter, without requiring use of the switch.

Figure 6:
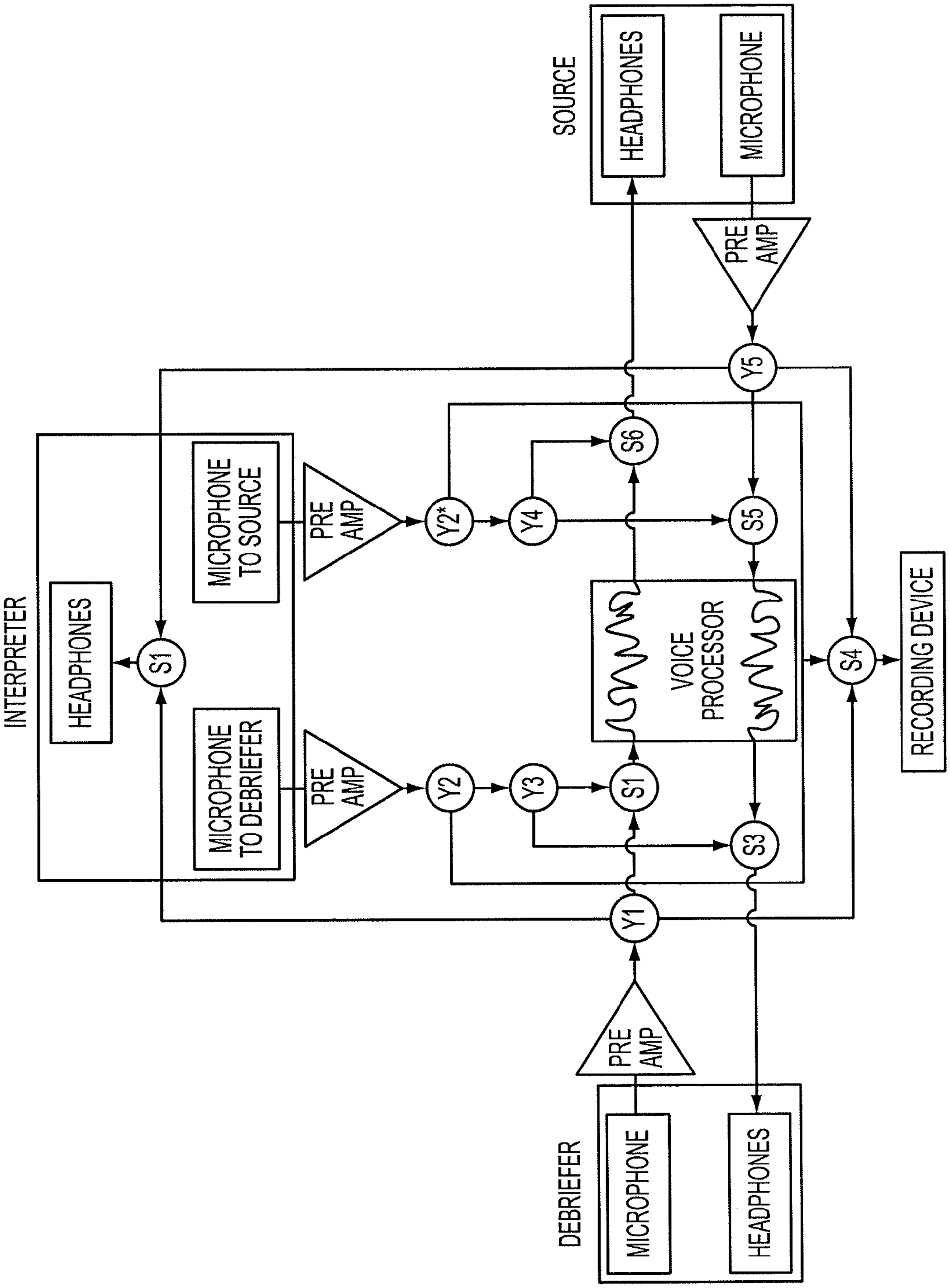
FIG. 6 is a schematic of an electronic language simulator system according to an embodiment of the invention.
Figure 7:
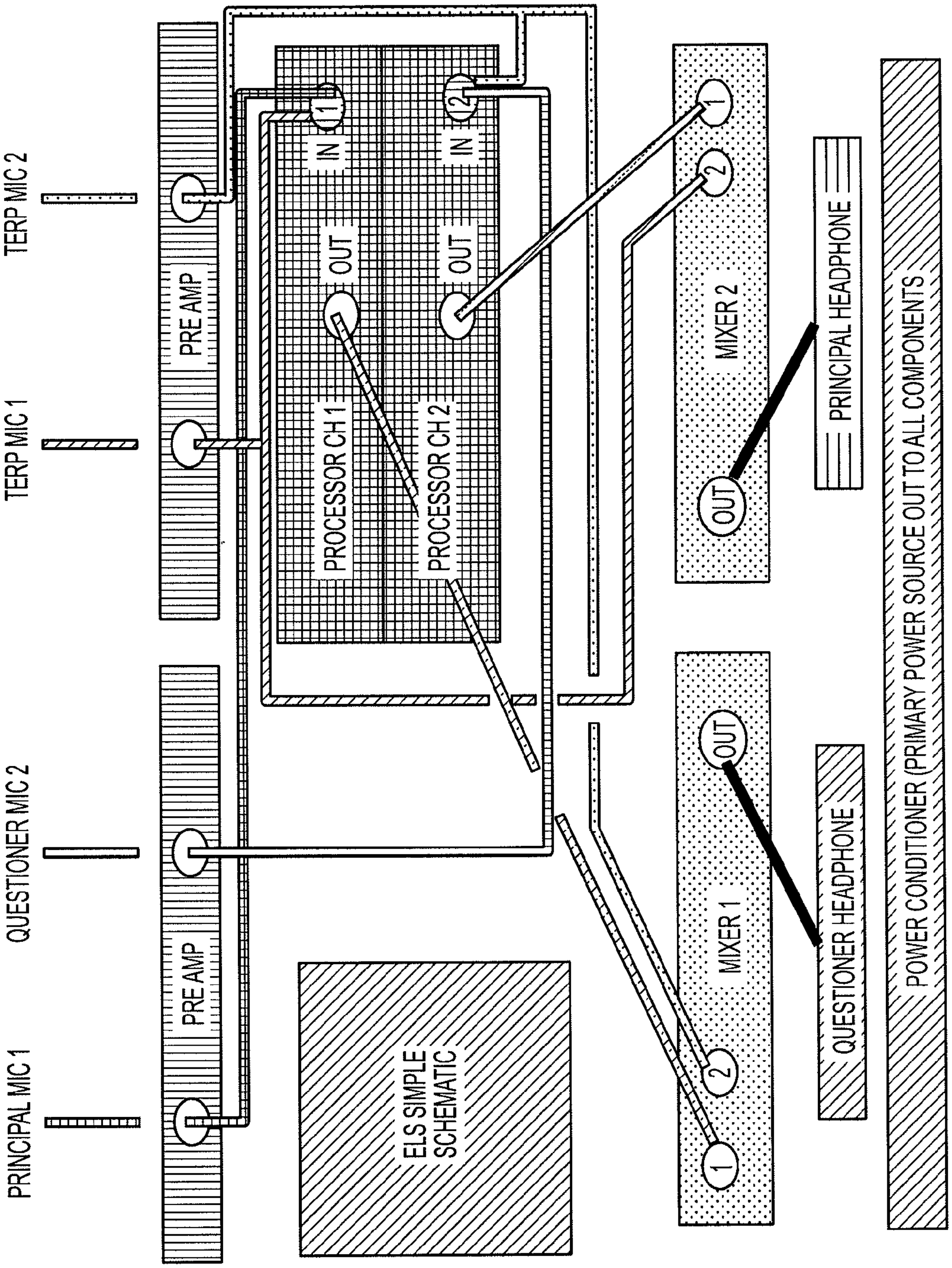
FIG. 7 is another schematic of the electronic language simulator system of FIG. 6 according to an embodiment of the invention.

In FIGS. 6 and 7 a first pre-amplifier can receive the debriefer's microphone output, a second pre-amplifier can receive the source's microphone output, a third pre-amplifier can receive the output from a first interpreter microphone (e.g., a microphone for undistorted communication between the interpreter and the debriefer), and a fourth pre-amplifier can receive the output from a second interpreter microphone (e.g., a microphone for undistorted communication between the interpreter and the source). The first and second interpreter microphones can be "push-to-talk" microphones, so that the interpreter simply presses a button on the microphone's base to talk to the intended party. This can prevent an open gate on ambient conversation not passing through the processor. In further embodiments, the first and second interpreter microphones can be supported on a single base with two or more buttons.

The output from the first and the third pre-amplifiers (i.e., the output from the debriefer and the interpreter's communication to the debriefer) can be routed to the input of a first channel of a processor. The processor can distort the inputs to the first channel. The distorted output from the first channel can then be routed to a first mixer and mixed with an undistorted output from the output from position 2 of the switch, or the second interpreter microphone (i.e., the interpreter's undistorted communication with the source). The output from the mixer, including the distorted communication from the debriefer, the distorted communication from the interpreter to the debriefer, and/or the undistorted communication from the interpreter to the source, can be routed to the source's headphones.

The output from the second and fourth pre-amplifiers (i.e., the output from the source and the interpreter's communication to the source) can be routed to the input of a second channel of the processor. The processor can distort the inputs to the second channel. The distorted output from the second channel can then be routed to a second mixer and mixed with an undistorted output from position 1 of the switch, or the first interpreter microphone (i.e., the interpreter's undistorted communication with the debriefer). The output from the mixer, including the distorted communication from the source, the distorted communication from the interpreter to the source, and/or the undistorted communication from the interpreter to the debriefer, can be routed to the debriefer's headphones.

The pre-amplifiers of FIGS. 5-7 can be similar to that explained with reference to FIGS. 1-3. Further, the summers SI-S5 and splitters YI-Y5 shown in FIG. 5 can be incorporated into the mixers of FIGS. 1-3 and 7. In addition, the voice processor and processor of FIGS. 5-6 and 7, respectively, can be similar to the processor of FIGS. 1-3.

The processor, or voice processor, can be a general purpose processor with programmed processing algorithms, or a special purpose processor specially designed for voice processing. In some embodiments, the processor can utilize analog input signals. In other embodiments, the processor can use a digital signal processor to first sample the analog input signals and then process the resulting digital signals. Examples of suitable processors may include, for example, the EVENTIDE ECLIPSE HARMONIZER, and the BOSS DD-7.

Various distortion techniques can be applied using the simulator 100. Some embodiments of the invention apply distortion techniques that preserve the tonality and tempo of the speaker's voice. For example, a delay-line feedback system such as that used in the "wah-wah" pedal of a guitarist provides effective distortion. In one embodiment, a duel reverse algorithm can be used that combines a signal with its reversed counterpart that is delayed by, for example, between about 125 milliseconds and about 150 milliseconds. If the delay is too short, the distortion of the voice is not effective. Too long of a delay and the lost temporal relationship between the speaker talking and the listener hearing the voice will be noticeable.

The user may be able to adjust the delay manually, for example, using the "delay program" button and keypad on the front panel. In addition, the processor can contain alternate algorithms to keep a steady delay, or randomly generate a delay time (e.g., within the above range) and change the delay throughout conversations. In other embodiments, other distortion schemes deemed suitable by the user can be used with the simulator 100. The processor may also include algorithms that recognize patterns in input waveforms and perform different distortion techniques based on the patterns. For example, a palindrome such as the word "Bob" reversed will still be output as "Bob". The processor may perform a different mixing or delay to prevent such words from being recognizable.

Figure 8:
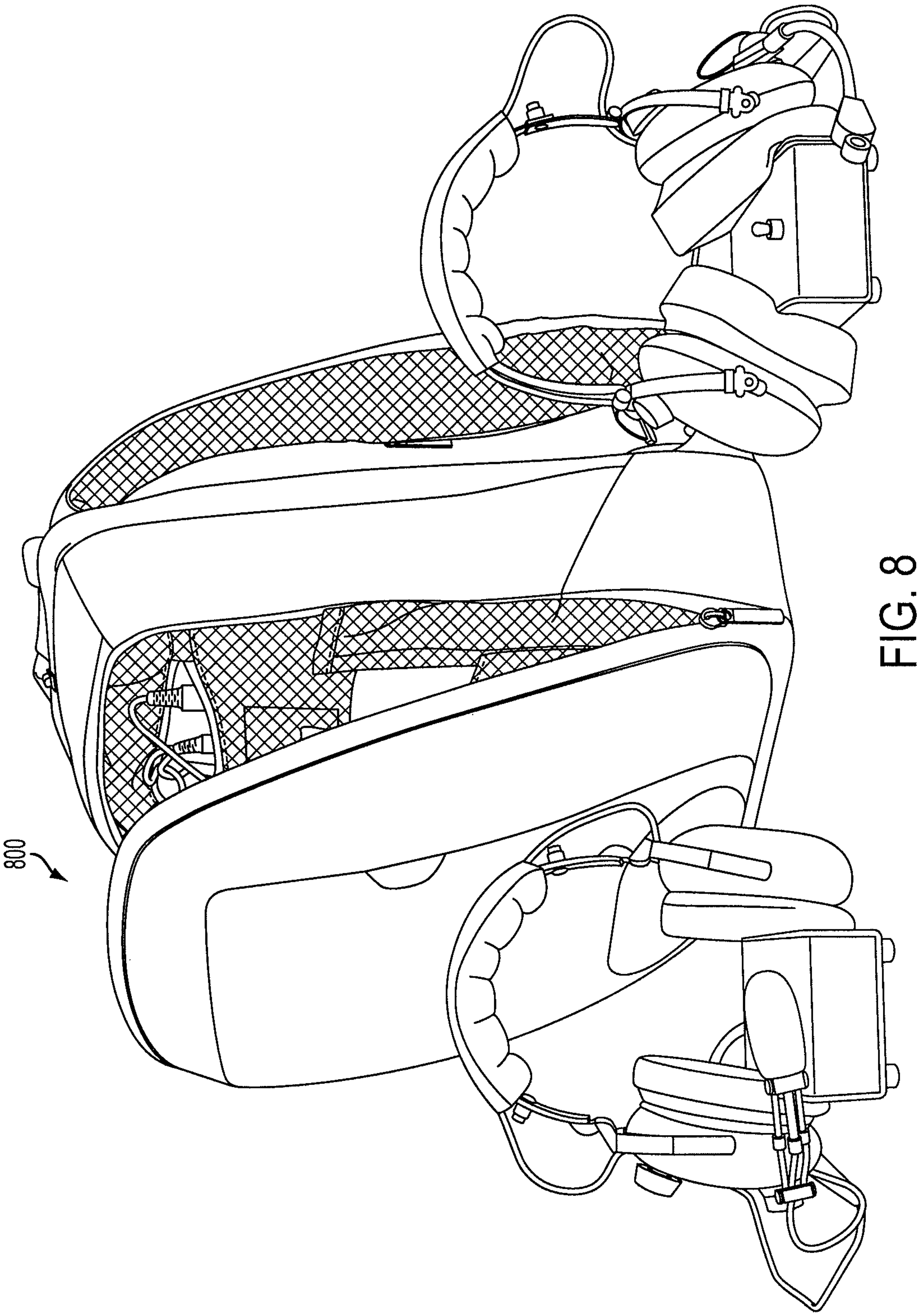
FIG. 8 is a perspective view of a portable electronic language simulator system according to an embodiment of the invention.

FIG. 8 is a perspective view of a portable battery powered electronic language simulator system 800 according to an embodiment of the invention. In FIG. 8 the electronics of the electronic language simulator 800 are located in a backpack that also includes a battery power source. This configuration allows for simulations to occur in the field. The processors, the preamps, and the mixers may each be self contained components within the portable system. This allows for individual components to be replaced if the simulator is damaged during use.

This application discloses several numerical ranges in the text and figures. The numerical ranges disclosed inherently support any range or value within the disclosed numerical ranges even though a precise range limitation is not stated verbatim in the specification because this invention can be practiced throughout the disclosed numerical ranges.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

What is claimed new and desired to be protected by Letters Patent of the United States is:

1. A method of simulating a conversation utilizing an interpreter comprising:

distorting speech between a debriefer and a source utilizing a sound processing system, while simultaneously providing undistorted speech from the debriefer or the source to a translator;

distorting speech between the translator and the debriefer utilizing the sound processing system, while simultaneously providing undistorted speech from the translator to the source when the translator is speaking to the source; and distorting speech between the translator and the source utilizing the sound processing system, while simultaneously providing undistorted speech from the translator to the debriefer when the translator is speaking to the debriefer.

2. The method of claim 1, wherein the sound processing system utilizes a duel reverse algorithm that combines a speech signal with its reversed counterpart that is delayed to distort speech.

3. The method of claim 2, wherein the delay is between 125 milliseconds and 150 milliseconds.

4. The method of claim 1, wherein the sound processing system comprises a debriefer microphone, a translator microphone, and a source microphone.

5. The method of claim 1, wherein the sound processing system comprises debriefer headphones, translator headphones, and source headphones.

6. The method of claim 1, wherein the sound processing system comprises a mixer and a pre-amplifier.

7. The method of claim 1, wherein the sound processing system comprises an interpreter switch box to allow the interpreter to switch between speaking to the debriefer and speaking to the source.

8. The method of claim 1, wherein tonality and tempo of the distorted speech between the debriefer, the source, or the translator is preserved.

9. An interpreter simulator comprising:

a sound processing system configured to: a) distort speech between a debriefer and a source, while simultaneously allowing undistorted speech from the debriefer or the source to a translator, b) distort speech between the translator and the debriefer, while simultaneously allowing undistorted speech from the translator to the source when the translator is speaking to the source, and c) distort speech between the translator and the source, while simultaneously providing undistorted speech from the translator to the debriefer when the translator is speaking to the debriefer.

10. The interpreter simulator of claim 9, wherein the sound processing system utilizes a duel reverse algorithm that combines a speech signal with its reversed counterpart that is delayed to distort speech.

11. The interpreter simulator of claim 10, wherein the delay is between 125 milliseconds and 150 milliseconds.

12. The interpreter simulator of claim 9, wherein the sound processing system comprises a debriefer microphone, a translator microphone, and a source microphone.

13. The interpreter simulator of claim 9, wherein the sound processing system comprises debriefer headphones, translator headphones, and source headphones.

14. The interpreter simulator of claim 9, wherein the sound processing system comprises a mixer and a pre-amplifier.

15. The interpreter simulator of claim 9, wherein the sound processing system comprises an interpreter switch box to allow the interpreter to switch between speaking to the debriefer and speaking to the source.

16. An interpreter simulator comprising:

a debriefer input configured to accept speech from a debriefer;

a translator input configured to accept speech from a translator;

a source input configured to accept speech from a source;

a debriefer output configured to output sound to the debriefer;

a source output configured to output sound to the source; and a sound processor configured to: a) output distorted sound corresponding to the accepted speech from the debriefer to the source, b) output distorted sound corresponding to the accepted speech from the source to the debriefer, c) output distorted sound corresponding to the accepted speech from the translator to the source and simultaneously output undistorted sound corresponding to the accepted speech from the translator to the debriefer when the translator is talking to the debriefer, and d) output distorted sound corresponding to the accepted speech from the translator to the debriefer and simultaneously output undistorted sound corresponding to the accepted speech from the translator to the source when the translator is talking to the source.

17. The interpreter simulator of claim 16, further comprising a translator output configured to output sound to the translator.

18. The interpreter simulator of claim 17, wherein the outputted sound to the translator is undistorted speech from the debriefer or the source.

19. The interpreter simulator of claim 16, wherein the sound processor utilizes a duel reverse algorithm that combines a speech signal with its reversed counterpart that is delayed to distort speech.

20. The interpreter simulator of claim 19, wherein the delay is between 125 milliseconds and 150 milliseconds.

21. The interpreter simulator of claim 16, wherein the sound processor comprises a mixer and a pre-amplifier.

22. The interpreter simulator of claim 16, wherein the sound processor comprises an interpreter switch box to allow the interpreter to switch between speaking to the debriefer and speaking to the source.

23. A method of simulating a conversation utilizing an interpreter comprising:

accepting speech from a debriefer;

distorting the speech from the debriefer utilizing a sound processor to produce a distorted debriefer speech;

providing the distorted debriefer speech to the source, and simultaneously providing an undistorted speech from the debriefer to a translator;

accepting speech from the translator;

distorting the speech from the translator utilizing a sound processor to produce a distorted translator speech;

providing the distorted translator speech to the debriefer, and simultaneously providing an undistorted speech from the translator to the source, when the translator speaks to the source;

accepting speech from the source;

distorting the speech from the source utilizing a sound processor to produce a distorted source speech; and providing the distorted source speech to the debriefer, and simultaneously providing an undistorted speech from the source to the translator.

24. The method of claim 23, further comprising:

accepting speech from the translator;

distorting the speech from the translator utilizing a sound processor to produce a distorted translator speech; and providing the distorted translator speech to the source, and simultaneously providing an undistorted speech from the translator to the debriefer, when the translator speaks to the debriefer.

25. The method of claim 23, wherein the sound processor utilizes a duel reverse algorithm that combines a speech signal with its reversed counterpart that is delayed to distort speech.

26. The method of claim 8, wherein the delay is between 125 milliseconds and 150 milliseconds.

* * * * *